United States Patent
Hollingsworth et al.

(10) Patent No.: US 8,329,090 B2
(45) Date of Patent: Dec. 11, 2012

(54) COMPOUND TRANSPARENT CERAMICS AND METHODS OF PREPARATION THEREOF

(75) Inventors: Joel P. Hollingsworth, Oakland, CA (US); Joshua D. Kuntz, Livermore, CA (US); Thomas F. Soules, Livermore, CA (US); Richard L. Landingham, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 416 days.

(21) Appl. No.: 12/603,195

(22) Filed: Oct. 21, 2009

(65) Prior Publication Data
US 2010/0105539 A1    Apr. 29, 2010

Related U.S. Application Data

(60) Provisional application No. 61/108,106, filed on Oct. 24, 2008.

(51) Int. Cl.
*B28B 1/00* (2006.01)
*B28B 3/00* (2006.01)
*B28B 5/00* (2006.01)
*C04B 33/32* (2006.01)
*C04B 33/36* (2006.01)
*C04B 35/64* (2006.01)
*C04B 35/50* (2006.01)

(52) U.S. Cl. ......... 264/642; 264/621; 264/681; 501/152
(58) Field of Classification Search .............. 501/152, 501/153; 264/681, 621, 642, 653
See application file for complete search history.

(56) References Cited

U.S. PATENT DOCUMENTS

| | | | | |
|---|---|---|---|---|
| 4,906,424 | A | 3/1990 | Hughes et al. | 264/63 |
| 6,844,285 | B1 * | 1/2005 | Wei | 501/152 |
| 7,022,262 | B2 * | 4/2006 | Lee et al. | 252/301.4 R |
| 7,799,267 | B2 * | 9/2010 | Messing et al. | 264/650 |
| 2003/0051811 | A1 * | 3/2003 | Uchimaru et al. | 156/345.1 |

FOREIGN PATENT DOCUMENTS
EP    1 245 696 A2    10/2002
(Continued)

OTHER PUBLICATIONS

Tsai et al., "Controlled Gelation and Sintering of Monolithic Gels Prepared from γ-Alumina Fume Powder" Supported by the National Science Council of Taiwan under Grant No. NSC79-0402-E011-07. Manuscript No. 197368, approved Jan. 10, 1991.

(Continued)

*Primary Examiner* — Noah Wiese
(74) *Attorney, Agent, or Firm* — Dominic M. Kotab

(57) ABSTRACT

According to one embodiment, a method for forming a composite transparent ceramic preform includes forming a first suspension of oxide particles in a first solvent which includes a first dispersant but does not include a gelling agent, adding the first suspension to a first mold of a desired shape, and uniformly curing the first suspension in the first mold until stable. The method also includes forming a second suspension of oxide particles in a second solvent which includes a second dispersant but does not include a gelling agent, adding the second suspension to the stable first suspension in a second mold of a desired shape encompassing the first suspension and the second suspension, and uniformly curing the second suspension in the second mold until stable. Other methods for forming a composite transparent ceramic preform are also described according to several other embodiments. Structures are also disclosed.

37 Claims, 3 Drawing Sheets

FOREIGN PATENT DOCUMENTS

| | | |
|---|---|---|
| EP | 1 245 696 A3 | 2/2004 |
| JP | 62288130 A | 12/1887 |
| WO | WO 2010/048529 A2 | 4/2010 |

OTHER PUBLICATIONS

R. Clasen, Preparation and Sintering of High-Density Green Bodies to High Purity Silica Glasses Journal of Non-Crystalline Solids 89 (1987) 335-344: North Holland, Amsterdam.

Kosmač et al., "Hydrolysis-Assisted Solidification (HAS): A New Setting Concept for Cermanic Net-Shaping" Journal of European Ceramic Society 17 (1997) 427-423, 1996 Elsevier Science Limited, Great Britain.

Kong et al., "Hydrolysis-assisted solidification of alumina slurry dispersed in silica sol without de-airing process" Materials Science and Engineering A 426 (2006) 36-42 www.elsevier.com.locate.msea.

Halverson, D.C. "Boron Carbide-Aluminum Cermets" Lawrence Livermore National Laboratory; UCRL, No. 95119, 1986.

Fischer S.H.; Grubelich, M.C., "Theoretical Energy Release of Thermites, Intermetallics, And Combustible Metals" Proceedings from the 24$^{th}$ International Pyrotechnics Seminar 1998, Monterey, CA, pp. 231-286.

Brinker C.J.; Scherrer, G., "Chapter 11: Sintering" Sol-gel Science, 1990, Wiley.

Gash, A.E.; Simpson, R.L.; Tillotson, T.M.; Satcher, J.H., Jr.; Hrubesh, L.W. "Making Nanostructured Pyrotechnics In a Beaker" Proc. 27$^{th}$ Int. Pyrotech. Sem. Grand Junctions, CO, Jul. 15-21, 2000, p. 41-53.

Tillotson, T.M.; Gash, A.E,; Simpson, R.L.; Hrubesh. L.W.; Poco, J.F., "Nanostructured energetic materials using sol-gel methodologies" J. Non-Cryst. Solids 2001, 285, 338-345.

Li et al., "YAG ceramic processed by slip casting via aqueous slurries" © 2006 Elsevier Ltd and Techna Group S.r.l., Science Direct, Ceramics International, vol. 34, p. 397-401, www.elsevier.com/locate/ceramint.

Invitation To Pay Additional Fees And, Where Applicable, Protest Fee from PCT Application No. PCT/US2009/061867 mailed on May 25, 2010.

Notification Concerning Availability of the Publication of the International Application from PCT application No. PCT/US2009/061887 mailed Apr. 29, 2010.

International Search Report and Written Opinion from PCT application No. PCT/US2009/061887 mailed Jul. 23, 2010.

International Preliminary Report on Patentability from PCT Application No. PCT/US20091061887 dated May 5, 2011.

* cited by examiner

COMPOUND TRANSPARENT CERAMICS AND METHODS OF PREPARATION THEREOF

RELATED APPLICATIONS

This application claims priority to provisional U.S. appl. No. 61/108,106 filed on Oct. 24, 2008, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to transparent ceramics for use in lasers, and particularly, to the preparation of compound transparent ceramics by gel casting nano-sized particles.

BACKGROUND

Exceptional ceramic parts having laser optical transparency have been fabricated and are commercially available. These parts are typically made starting with a very pure co-precipitated powder which is then slip cast to form the green structure or preform prior to sintering. After vacuum sintering and hot isostatic pressing and polishing, the parts are rendered transparent enough for use in laser applications.

A uniform slurry of high purity powder is poured into a plaster mold which sucks the water out of the slurry by capillary forces and produces the green structure after drying. Using fluid flow and surface tension to consolidate the ceramic powder allows parts to be made with a uniform powder packing. However, because the mold removes the water, slip casting can only be used for relatively thin parts. The need for a very porous surface on the mold also introduces another variable in the green structure fabrication. The porous mold usually made of commercial gypsum may also be a source of contamination. Cold uniaxial pressing and cold isostatic pressing have also been used to make transparent parts. However, inter-particle friction during the pressing process tends to prevent densification in the center of the part so that size of the part must be kept small enough that this does not cause porosity.

In order to increase the driving force for sintering, a finer nano-sized powder than that produced by precipitation may be used. This can be especially important for achieving high transparency needed for lasers. Finer particles because of their increased surface area sinter more easily. Very small trapped pores are also less effective in scattering light.

However, smaller nano-sized particles behave differently than larger (such as micrometer) sized particles during green structure consolidation. For instance, smaller particles experience more friction as they move past one another in a die making it more difficult to produce a uniform structure through cold pressing, especially larger parts are desired. The higher surface area of finer particles also requires more water for wetting making it difficult to get the solids loading high for slipcast slurries. As a result, after slip casting there is significant shrinkage on drying often leading to cracking and other problems. Finer particles are more susceptible to surface-area-dependent chemical reactions, as may occur between a porous mold and certain ceramic powders.

Compound transparent ceramic optical components have been typically made by partially sintering one part, for example, the amplifier slab. Then the edges of the slab are carefully polished to a fraction of wavelength in flatness. A second part, a piece of a frame designed to suppress amplified spontaneous emission is similarly partially sintered and polished on its edge. The two pieces are placed in contact and held firmly in place in a furnace. Diffusion bonding occurs in which some atoms on one piece diffuse across the interface and into the other and the two pieces become bonded with no gap between them. This approach was used by Konoshima Ltd. to clad Nd:YAG amplifier slabs with an amplified spontaneous emission suppressing Sm:YAG frame (see Soules, Thomas F., "*Transparent ceramics Spark Laser Advances*", Lawrence Livermore Science and Technology, April, 2006, available at www.llnl.qovlstrIAori/061Soules.html.).

Generally, parts may not be made with graded dopant concentrations, although such parts could be very beneficial to laser performance. Also, more complicated transparent ceramic compound structures than the one described above may not generally be made. One reason for this is that the above method employed by Konoshima would be difficult and expensive to extend to a complex part with many components much less a continuously varying composition.

Therefore, a method to more easily fabricate compound transparent ceramic structures, such as producing compound and complicated ceramic performs prior to sintering, would be very beneficial to the field of lasers.

SUMMARY

According to one embodiment, a method for forming a composite transparent ceramic preform includes forming a first suspension of oxide particles in a first solvent which includes a first dispersant but does not include a gelling agent, adding the first suspension to a first mold of a desired shape, and uniformly curing the first suspension in the first mold until stable. The method also includes forming a second suspension of oxide particles in a second solvent which includes a second dispersant but does not include a gelling agent, adding the second suspension to the stable first suspension in a second mold of a desired shape encompassing the first suspension and the second suspension, and uniformly curing the second suspension in the second mold until stable.

In another embodiment, a method for forming a composite transparent ceramic preform includes forming a first suspension of oxide particles in a first solvent which includes a first dispersant but does not include a gelling agent, agitating the first suspension, adding the first suspension to a first mold of a desired shape, and uniformly drying the first suspension in the first mold until stable. The method also includes forming a second suspension of oxide particles in a second solvent which includes a second dispersant but does not include a gelling agent, agitating the second suspension, adding the second suspension to the stable first suspension in a second mold of a desired shape encompassing the first suspension and the second suspension, and curing the first suspension and the second suspension in the second mold at a temperature of between about 20° C. and about 80° C. until stable.

In yet another embodiment, a method includes creating a graded and/or composite preform comprising unsintered inorganic particles, the preform being mechanically stable without support.

An article of manufacture according to one embodiment includes a sintered ceramic structure having a first and second regions having differing compositions, wherein an interface between the regions exhibits characteristics of intermingling of the different compositions prior to sintering of the structure.

Other aspects and embodiments of the present invention will become apparent from the following detailed description, which, when taken in conjunction with the drawings, illustrate by way of example the principles of the invention.

DETAILED DESCRIPTION

Figure 1A:
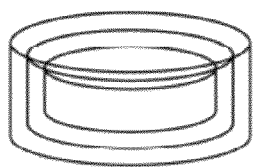
FIGS. 1A-1E are schematic diagrams of potential shapes of layered and/or stacked ceramic composite structures, according to some embodiments.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value. For example, a pH of about 9 refers to a pH of 9±0.9, a temperature of about 50° C. refers to a temperature of 50° C.±5° C., etc.

Disclosed herein, according to some embodiments, is a method for fabricating a composite ceramic green structure and/or ceramic preform structure using gel casting, the products made thereof, and applications of materials made using this and other methods. The methods disclosed herein are new methods of gel casting to produce a composite preform.

In one general embodiment, a method for forming a composite transparent ceramic preform comprises forming a first suspension of oxide particles in a first solvent, wherein the first suspension includes a first dispersant, with the proviso that the first suspension does not include a gelling agent. The method also includes adding the first suspension to a first mold of a desired shape, uniformly curing the first suspension in the first mold until stable, and forming a second suspension of oxide particles in a second solvent, wherein the second suspension includes a second dispersant, with the proviso that the second suspension does not include a gelling agent. The method further includes adding the second suspension to the stable first suspension in a second mold of a desired shape encompassing the first suspension and the second suspension, and uniformly curing the second suspension in the second mold until stable.

In another general embodiment, a method for forming a composite transparent ceramic preform comprises forming a first suspension of oxide particles in a first solvent, wherein the first suspension includes a first dispersant, with the proviso that the first suspension does not include a gelling agent, and agitating the first suspension. The method also includes adding the first suspension to a first mold of a desired shape, and uniformly drying the first suspension in the first mold until stable. The method further includes forming a second suspension of oxide particles in a second solvent, wherein the second suspension includes a second dispersant, with the proviso that the second suspension does not include a gelling agent, agitating the second suspension, adding the second suspension to the stable first suspension in a second mold of a desired shape encompassing the first suspension and the second suspension, and curing the first suspension and the second suspension in the second mold at a temperature of between about 20° C. and about 80° C. until stable.

According to another general embodiment, a method for forming a transparent ceramic preform comprises forming a first suspension of oxide particles comprised primarily of yttrium aluminum garnet (YAG) formed via flame-spraypyrolysis (FSP) having a primary particle diameter of between about 10 nm and about 80 nm in a first solvent comprising de-ionized water and ammonia, the solvent having a pH of about 10.5, wherein the first suspension includes ammonium acrylate used as a first dispersant, wherein a volume percent of solids in a total volume of the first suspension is between about 25 vol. % and about 45 vol. %., with the proviso that the first suspension does not include a gelling agent. The method also includes adding the suspension into a first mold of a desired shape, wherein the first mold is sealed after the adding, heating the first suspension in the first mold to a temperature of about 50° C., and holding the temperature about constant for a time of between about 10 hours and about 24 hours until the first suspension is stable. The method further includes removing the first suspension from the first mold, and forming a second suspension of oxide particles comprised primarily of yttrium aluminum garnet (YAG) formed via flame-spraypyrolysis (FSP) having a primary particle diameter of between about 10 nm and about 80 nm in the solvent having a pH of about 10.5, wherein the second suspension includes ammonium acrylate used as a dispersant, wherein a volume percent of solids in a total volume of the second suspension is between about 25 vol. % and about 45 vol. %., wherein the second suspension has an active dopant different from an active dopant in the first suspension or a different concentration of the same active dopant as that of the first suspension, with the proviso that the second suspension does not include a gelling agent. In addition, the method includes adding the second suspension to the stable first suspension in a second mold of a desired shape encompassing the first suspension and the second suspension, wherein the second mold is sealed after the adding, heating the first and second suspensions in the second mold to a temperature of about 50° C., holding the temperature about constant for a time of between about 10 hours and about 24 hours until the second suspension is stable, and allowing the stable second suspension to dry at a temperature of about 20° C. until suitably dry.

In yet another general embodiment, a method comprises creating a graded and/or composite preform, the preform being mechanically stable without support, wherein the preform comprises unsintered inorganic particles.

According to one embodiment, a method for producing a composite ceramic preform may be described. A first suspension (first gel) containing fine nano-sized (about 10 nm to about 2000 nm in diameter) oxide particles with a solids content of preferably greater than about 20 vol. % solids is formed in a first mold using the methods described below for forming a transparent ceramic preform.

An article of manufacture according to one general embodiment includes a sintered ceramic structure having a first and second regions having differing compositions, wherein an interface between the regions exhibits characteristics of intermingling of the different compositions prior to sintering of the structure.

Figure 1B:
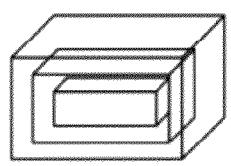
Figure 1C:
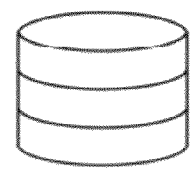
Figure 1D:
Figure 1E:

Depending on the desired design, the first gel can be aged and/or dried to some extent while remaining a gel. Because the first gel made according to the methods described below for forming a transparent ceramic preform is mechanically stable and shrinks very little, it maintains its shape when a second suspension, slurry, and/or mixture is added to it. In some embodiments, the second suspension may be added (perhaps by pouring) to the first suspension (first gel), may be injected into the first suspension, may be formed around the first suspension, etc. Any desired shape may be used for the first and second molds, such as concentric cylinders as shown in FIG. 1A, concentric hexahedrons as shown in FIG. 1B, stacked cylinders as shown in FIG. 1C, adjacent hexahedrons as shown in FIG. 1D, concentric rings as shown in FIG. 1E, etc.

In one embodiment, a first gel is placed inside a second mold larger than the first mold in which the first gel was cast. Subsequently, a second suspension having the same particles (perhaps with a different active dopant or a different concentration of the same active dopant) or different particles is added to a gap between the first gel and the second mold. If the first gel has been dried somewhat (until the gel is stable and able to absorb some of the second suspension), the second suspension will diffuse into the first gel. This can be used to provide a smooth gradient going from one particle composition (first gel) to another (second suspension, second gel after curing).

Alternatively, in another embodiment, if the first gel is cured, the second suspension may be added (such as by pouring) around it, and then both may be dried together. This will produce a sharper change in composition between the first gel and the second suspension (second gel after curing). It is clear that this method can be easily extended to form a part with many components of concentric layers or an infinite variety of other compound shapes. It is also clear that this method can be used to produce a gradient in dopant concentration across the gel layers by casting successive layers with increasing or decreasing dopant concentrations in each layer. The core (first gel) may be spherical, polyhedronical, cylindrical, hexahedronal, or a more complicated shape according to the particular application for which the transparent ceramic is being produced. Each successive layer may be of a similar shape or a different shape, depending on the desired effect of the overall structure.

Also, in some approaches, the subsequent layers may or may not be concentric. In another embodiment, suppression of amplified spontaneous emission (ASE) may be provided with a patterned distribution around cells of Nd:YAG or other material. The amplifier slabs may be placed like tiles in a very large mold and a slurry containing the ASE suppressing particle, e.g., Sm:YAG, could be added (e.g., poured, scooped, etc.) around the slabs analogous to a grout around tiles. This approach may provide a way to limit the build up of ASE in very large aperture applications.

In another preferred embodiment, dopant ions may be patterned within a gel cast structure by the following method. A gel may be formed of the host material. The liquid in the gel may be exchanged with a solution containing the dopant and compensating ions that may maintain the stoichiometry of the final part. The solution may contain metallic salts or organo-metallic compounds with the dopant ions, such as, isopropoxides, acetylacetonates (acac's) or others in a solvent (e.g., alcohol, water, ammonia, etc.). A subsequent gel casting slurry including the host material particles, but possibly without the active ions, may be added (e.g., poured, scooped, etc.) around the gel. The active ions in the liquid interstices of the first gel diffuse out and into the second slurry as it cures. With an appropriate control of temperature, curing rate, and drying rate, the extent of diffusion into the second slurry may be controlled as it cures. In this way, a graded dopant concentration may be achieved. During subsequent sintering, the dopant ions are incorporated into the ceramic and as long as they are in the right stoichiometric proportions, no secondary phases are formed. The distribution of dopant ions that exist in the dried gel may be largely reflected in the final part, although it may be slightly further diffused by diffusion occurring during sintering.

The flexibility of gel casting allows many other embodiments that incorporate using the gel and/or the liquid contained in the gel to fabricate complicated compound gel structures. These techniques, as long as they employ casting the gel in a compound structure, or producing a tailored gel, or both, prior to sintering, are additional extensions of the techniques described herein.

Previously, reference was made to methods for forming a transparent ceramic preform. These methods are described below, along with additional embodiments to provide more detail into the transparent ceramic preform manufacturing technique.

According to one embodiment, a slurry or suspension of fine to very fine oxide particles are formed in a solvent. The solvent liquid is preferably purified de-ionized or distilled water. Other solvents can be used if they evaporate completely or nearly completely at or below 200° C., or if they decompose or are capable of being incorporated into the formed preform, without leaving any ash or residue. Some other solvents include alcohols, aldehydes, and other organic solvents.

Note that the particles do not necessarily dissolve in the solvent; rather the solvent and particles typically form a slurry or mixture. In fact, "suspension" as used herein may refer to a slurry, a mixture, a combination, a blend, etc. A suspension is one preferred mode of the mixture of components described herein.

When using an aqueous suspension of oxide particles, the pH of the water may be adjusted to be between about 2 and about 5, or between about 8 and about 12, depending on the oxide particles used and any additional components in the solvent. In one example, when yttrium aluminum garnet (YAG) particles that are produced via flame spray pyrolysis (FSP) are used as the oxide particles, the pH of the water may preferably be between about 9 and about 11, even more preferably about 10.5. The most preferred pH may vary depending on the oxide being suspended and may be chosen to result in a zeta-potential for the suspension as far from zero as possible to produce a good suspension.

In some approaches, the pH may be adjusted with an easily removable base or acid, and in some preferred approaches, the base may be ammonia or the acid may be nitric acid. Any other base or acid may also be used to obtain the desired pH. Additives which react with water as the gel cures in later processing, altering the pH of the solvent, are known in the prior art, and may optionally be used to adjust the pH. These include but are not limited to urea, biuret, formamide, ammonium carbamate, and insoluble additives such as aluminum nitride.

In some approaches, the oxide particles may be prepared as a powder. This powder may be prepared using flame-spray pyrolysis (FSP). In FSP, an organo-metallic containing the stoichiometrically correct amounts of the metal ions is burned in a suitable fuel. This method for obtaining nano-sized, spherical particles of oxides is known in the prior art. In this embodiment, the smoke is comprised primarily of the desired oxide particle powder. Other methods for obtaining these nano-powders, such as by fuming, co-precipitation, and mixing of powders, are also possible. Other methods of forming/acquiring the particles include crushing, e.g., in a pin mixer or ball mill, purchasing the particles from a supplier, screening fines from a source; etc. Of course, any other method may be used to produce the oxide particle powder that results in the oxide particles having the desired particle diameter range.

One unique aspect of the methods for preform production described herein is that no effective amount of a polymer, binder, and/or other gelling agent may be added to the solvent and preferably none is present at all. For example, the preform may be formed without the aid of the binder and/or polymer and/or gelling agent (used interchangeably herein). A "gelling agent" as used herein is generally defined as any material that promotes agglomeration of the particles. In addition, many gelling agents exhibit at least one of the following properties: nonevaporative at 50° C.; is capable of, or would tend to exhibit, crosslinking at some point after addition. In contrast, typical gel-casting methods require one of these gelling agents to be added in order to properly gel.

In some approaches, a small amount of dispersant may be added to the suspension to achieve the solids loading for gel-casting. Some suitable organic dispersants include ammonium polymethacrylate (DARVAN C-N), an ammonium polymethacrylate, DISPEX MO, and/or a narrow molecular weight range ammonium polyacrylate. Alternatively, free metal ions such as yttrium (3+) and/or aluminum (3+) may be used as the dispersant. When free metal ions are used as the dispersant, they may be added to the solvent as a metal salt, e.g., a nitrate salt. Particular care is taken so as not to disturb the phase purity of the finished ceramic. Sodium silicate solution or other inorganic dispersants may also be suitable dispersants. In some preferred approaches, ammonium acrylate dispersants may be used, as they generally have an advantage over other dispersants in that they completely burn out during subsequent processing, thereby not leaving a residue. Enough dispersant may be added so as to stabilize the suspension and decrease a viscosity of the suspension. According to some embodiments, the amount of dispersant added to the suspension may be between 0.5 wt. % to about 3.0 wt. % of the weight of the solids when using organic dispersants, and between about 0.01 wt. % to about 0.5 wt. % of the weight of solids in the case of metal salts. The preferred weight of dispersants added to the suspension may be obtained by constructing a series and determining what level of dispersants results in the maximum solids content of the suspension. Of course, the amount of dispersant used may vary depending on the components of the suspension, and may be further refined based on experimentation.

According to some embodiments, the powder particles may have a primary particle diameter between about 5 nm and about 2000 nm, more preferably between about 5 nm and about 200 nm, and even more preferably between about 10 nm and about 80 nm. A primary particle diameter may include a mean particle diameter, a median particle diameter, etc. In the example where the oxide particle comprises YAG, this corresponds to a surface area BET measurement of about 80 $m^2/g$ to about 200 $m^2/g$. The particle size defined here is an individual grain size. Aggregate sizes generally may be larger.

In some approaches, the nano-scale particle powders may preferably be spherical in morphology and/or produced via flame-spray pyrolysis (FSP). Some oxide particles that may be used with methods disclosed herein include, but are not limited to, yttrium aluminum garnet (YAG), neodymium doped YAG (Nd:YAG), various other doped or un-doped rare-earth garnets including yttrium scandium aluminum garnet, lutetium aluminum garnet, gadolinium gallium garnet, etc., yttrium oxide, ytterbium doped yttrium oxide, and other doped cubic oxides including scandia, lutetia, zirconia, etc.

According to some embodiments, mechanical stirring, centrifugal mixing, or some other method of agitating the suspension may be used as the oxide particles are added to the solvent and/or after the oxide particles are added to the solvent to form the suspension. Also, the pH of the solvent and/or the suspension may be controlled.

Subsequently, the thick suspension is subjected to a form of high energy agitation to remove trapped air and wet all the particles thoroughly, in some embodiments. The high energy agitation preferably is thorough and energetic enough to break up powder agglomerates and disperse the particles thoroughly and uniformly throughout the suspension. Suitable forms of high energy agitation include subjecting the suspension to an ultrasonic vibration, using a very high shear mixer, and some form of a high energy ball mill with media appropriate to break up the nano-sized and larger agglomerates. Generally, after the high energy agitation, the viscosity of the suspension drops dramatically and additional oxide particles may be added, thereby producing a suspension with an even higher weight percent of oxide particles.

The total amount of oxide particles added to a given quantity of solvent preferably is greater than or approximately equal to the tap density of the dry particle powder, according to some embodiments. The amount of oxide particles added is generally limited to achieve complete wetting, dispersion, and mixing of the particle powder and solvent and to have a suspension that pours freely. Nevertheless, preferable powder loading is as high as possible following the high energy agitation. Most preferably, the suspension may be composed of at least about 15 vol. % oxide particles or higher. In other approaches, the suspension may be composed of between about 15 vol. % to about 60 vol. % oxide particles, more preferably between about 15 vol. % to about 50 vol. % oxide particles, even more preferably between about 25 vol. % to about 45 vol. % oxide particles.

After the suspension is produced, it is poured and/or transferred into a mold of a desired shape. In one preferred approach, the mold is impermeable. One of the advantages of this method to produce transparent ceramic performs is that many shapes may be achieved beyond that possible through conventionally used methods, which are generally limited to flat shapes due to the high pressure conditions used in the processing. In the present approach, the suspension may be allowed to gel in the mold until stable. The mold may be designed such that the stable suspension may be removed therefrom without excessive stresses being exerted on the suspension, thereby resulting in less chance of the suspension being harmed upon removal from the mold.

It has been unexpectedly found that the suspension containing a high loading of very fine (nano-sized) oxide particles may gel without the aid of gel forming polymers, binders, or other types of gelling agents. Curing preferably continues without drying until the preform is removed from the mold, resulting in no damage to the preform. In some approaches, curing may occur for between about 12 to about 72 hours (or longer) at room temperature (e.g., about 20° C.). In other approaches, the curing may occur for between about 4 hours to about 24 hours (or longer) at elevated temperatures, with the conditions preferably being chosen such that no gas is evolved from the suspension (except for potentially negligible evaporation), e.g., via boiling or via dissociation of carbonic acid. Preferably, the suspension may be allowed to cure in a sealed container for between about 40 hours to about 84 hours at between about 20° C. to about 80° C. In other approaches, between about 40° C. and about 60° C., and most preferably, the suspension may be allowed to cure in a sealed container for between about 8 hours and about 100 hours at a temperature of about 50° C. In one preferred embodiment, the suspension is cured in a sealed container (possibly the mold) at a temperature of about 50° C. for a period of time of about 72 hours. Of course, the temperature may vary during the curing, but the temperature may be held at about a constant temperature.

In addition to enabling gelation of the suspension in the mold, the high loading may result in less shrinkage during drying and thereby result in less susceptibility to cracking. This is in contrast to prior art methods of gelation, where drying during gelation may lead to cracking of the preform. The gelled preform may be dried in a fashion that is slow and uniform, such that the risk of cracking is substantially reduced. More preferably, the drying preform may be supported in such a way that all surfaces have similar access to air, and the drying may occur at room temperature (about 20° C.) until shrinkage ceases. Further, drying may be performed at an elevated temperature below the boiling point of the liquid according to some embodiments.

In some embodiments, any remaining solvent may be drained from the preform after the curing, and additional solvent may be added to the preform prior to the sintering to form a ceramic. The original solvent may be the same or different than the newly added solvent, and additional solvents may be added in successive drying steps, thereby allowing about complete replacement of any remaining original solvent in the preform with newly added solvent, prior to sintering to form a ceramic.

The dried preform may be handled after the drying. In some embodiments, the preform may be calcined. Calcination may comprise firing the preform in air at a temperature of between about 500° C. and about 1100° C. to remove any residual organic compounds or other residual substances and to create any desired phase change.

Subsequently, in some embodiments, the preform may be sintered using any prior art sintering method to create a transparent ceramic (polishing may be used to aid in producing the transparency of the ceramic).

A select number of examples are described below. These examples are based on neodymium-doped yttrium-aluminum garnet (YAG) particle powder, produced via FSP such that the particle powder's average particle diameter is about 50 nanometers. Of course, the teachings of these examples may be applied using any oxide particle, such as those described above.

In one example, a weight of fine FSP prepared Nd:YAG powder with a BET measured surface area of approximately 20 m²/g was suspended in de-ionized water containing ammonia with a pH of 10.5 in which ammonium polymethacrylate (DARVAN C) had been dissolved (0.015 parts by weight to 1 part Nd:YAG). The particle powder accounted for approximately 30 vol. % of the volume of the suspension. The suspension was prepared by alternately mixing in the particle powder with a polyethylene spatula, and then using a centrifugal mixer until a uniform, air-free paste was formed after which the suspension was placed under an ultrasonic horn until the mixture became pourable. This suspension was then poured into a polytetrafluoroethylene (TEFLON) mold. This mold was sealed and heated to 50° C. for approximately 16 hours. The cured preform was allowed to cool before being removed from the mold. The preform was blotted to remove excess water, then wrapped in absorbent paper and allowed to dry for several days at room temperature (about 20° C.). The dry green structure was sintered into a transparent ceramic part of a shape dictated by the shape of the mold.

According to another example, oxide particle powder from the previous example was suspended as above, but in dilute nitric acid solvent instead of water, with a pH of approximately 3. Urea was added to the suspension until 0.1 wt. % became dissolved in the suspension. The purpose of the urea is to release ammonia and change the pH during curing. The particle powder accounted for approximately 15 vol. % of the suspension's total volume. Mixing, agitation, curing, and drying proceeded similarly as was described in the previous example.

In another example, FSP prepared YAG powder was suspended in a solution of yttrium nitrate, aluminum nitrate, and urea. The pH was not controlled in any degree. The particle powder accounted for approximately 20 vol. % of the suspension's total volume. Nitrate concentrations were chosen such that the Y:Al ratio was 3:5, and the total nitrate concentration was such that less than 0.5% of metal atoms were added as nitrate. Three moles of urea were added per mole of metal ion. The suspension gelled under the same conditions as were described in the first example, and was dried in the same container to avoid preferential leaching of metal ions. The ceramic part sintered from this preform was substantially transparent, except for occasional white flecks.

Figure 2:
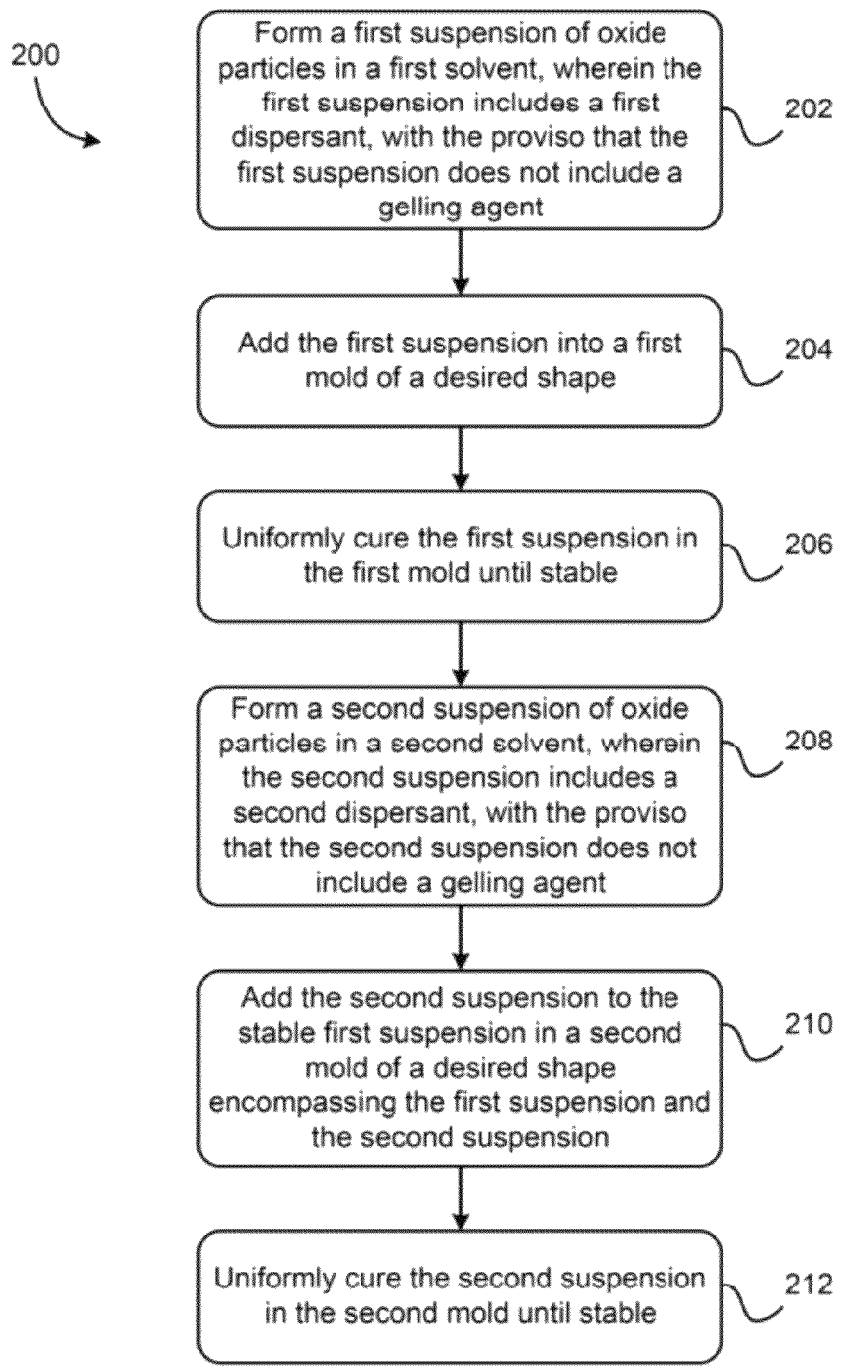
FIG. 2 is a flowchart of a method for forming a composite transparent ceramic preform, according to one embodiment.

Now referring to FIG. 2, a method 200 for forming a composite transparent ceramic preform is described according to one embodiment. The method 200 may be carried out in any desired environment, including those described above. In addition, any of the techniques and/or conditions described above may be carried out in the context and functionality of method 200.

In operation 202, a first suspension of oxide particles in a first solvent is formed, wherein the first suspension includes a first dispersant, with the proviso that the first suspension does not include a gelling agent.

According to one embodiment, the oxide particles may have a primary particle diameter of between about 5 nm and about 2000 nm, alternatively between about 10 nm and about 80 nm. In further embodiments, the oxide particles may be formed via flame-spray pyrolysis (FSP).

According to some approaches, the oxide particles may comprise at least one of yttrium aluminum garnet (YAG), neodymium doped YAG, yttrium scandium aluminum garnet, lutetium aluminum garnet, gadolinium gallium garnet, yttrium oxide, ytterbium doped yttrium oxide, doped scandia, doped lutetia, and doped zirconia.

In even more approaches, the first and second solvents may have a pH of between about 2 and about 5 or between about 9 and about 12. The range of the pH of the solvents depends on the solvent used, with some solvents functioning better under acidic conditions, and other solvents functioning better under basic conditions. In some approaches, the first and second solvents may comprise at least one of: water, ammonia, nitric acid, yttrium nitrate, aluminum nitrate, an alcohol, an aldehyde, an organic solvent, and urea, each of which may function better in a different pH range.

In some embodiments, a volume percent of solids in a total volume of the first and second suspensions is between about 15 vol. % and about 60 vol. %, alternatively between about 25 vol. % and about 45 vol. %.

In some approaches, the first and second dispersants may comprise at least one of: DARVAN C-N, an ammonium polymethacrylate, DISPEX MO, a narrow molecular weight range ammonium polyacrylate, a free metal ion salt, sodium silicate, and ammonium acrylate.

According to some approaches, the second suspension may have an active dopant different from an active dopant of the first suspension or the second suspension may have a different concentration of the same active dopant as that of the first suspension.

In operation 204, the first suspension is added to a first mold of a desired shape.

In operation 206, the first suspension is uniformly cured in the first mold until stable.

In operation 208, a second suspension of oxide particles in a second solvent is formed, wherein the second suspension includes a second dispersant, with the proviso that the second suspension does not include a gelling agent.

In operation 210, the second suspension is added to the stable first suspension in a second mold of a desired shape encompassing the first suspension and the second suspension.

In operation 212, the second suspension is uniformly cured in the second mold until stable. According to some embodiments, curing the first suspension and the second suspension comprises heating the first suspension in the first mold and the second suspension in the second mold to a temperature of between about 20° C. and about 80° C., and holding the temperature about constant for a time of between about 4 hours and about 72 hours.

In another approach, the first mold and the second mold are sealed during the curing, and the first suspension and the second suspension are heated to a temperature of about 50° C.

In one embodiment, the oxide particles comprise YAG, wherein the first and second solvents have a pH of between about 9 and about 11, and a volume percent of solids in a total volume of the first and second suspensions is between about 25 vol. % and about 45 vol. %.

In additional embodiments, the method 200 may further comprise calcining the cured first suspension at a temperature of between about 500° C. and about 1100° C. Additionally, the method 200 may further comprise calcining the cured second suspension at a temperature of between about 500° C. and about 1100° C.

Figure 3:
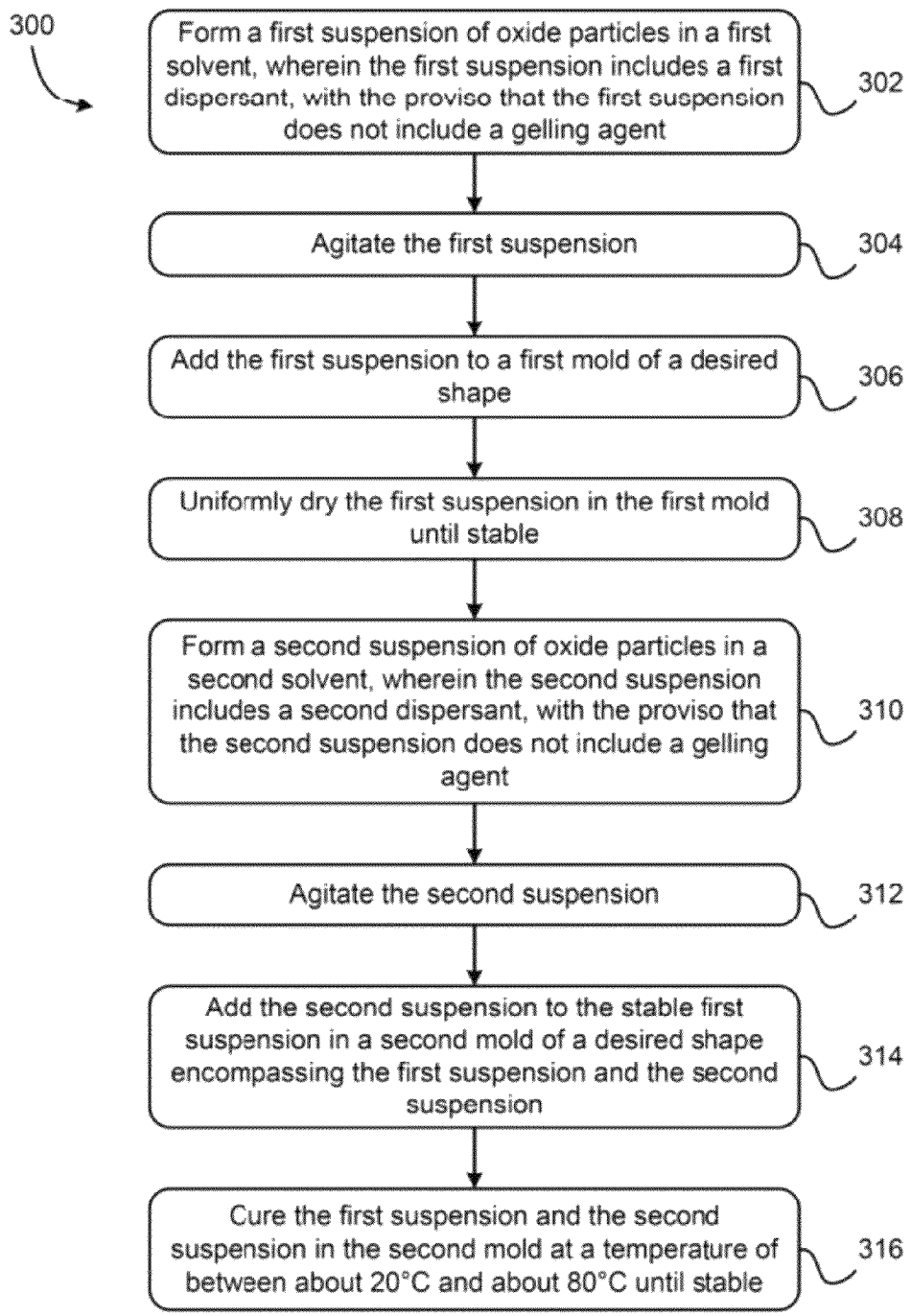
FIG. 3 is a flowchart of a method for forming a composite transparent ceramic preform, according to one embodiment.

Now referring to FIG. 3, another method 300 for forming a composite transparent ceramic preform is described according to one embodiment. Many more methods are possible using the techniques and/or unique capabilities described herein. The method 300 may be carried out in any desired environment, including those described above. In addition, any of the techniques and/or conditions described above may be carried out in the context and functionality of method 300.

In operation 302, a first suspension of oxide particles in a first solvent is formed, wherein the first suspension includes a first dispersant, with the proviso that the first suspension does not include a gelling agent.

In operation 304, the first suspension is agitated, using any technique known in the prior art, such as mechanical stirring, centrifugal stirring, shaking, subjecting the suspension to an ultrasonic vibration, using a very high shear mixer, some form of a high energy ball mill with media appropriate to break up the nano-sized and larger agglomerates, etc.

In operation 306, the first suspension is added to a first mold of a desired shape. The mold may have any shape, depending on the particular application for which the ceramic is to be used.

In operation 308, the first suspension in the first mold is uniformly dried until stable. Any drying technique may be used, such as heating, air drying, etc.

In operation 310, a second suspension of oxide particles in a second solvent is formed, wherein the second suspension includes a second dispersant, with the proviso that the second suspension does not include a gelling agent.

In operation 312, the second suspension is agitated. Any known agitation techniques may be used.

In operation 314, the second suspension is added (such as by pouring, scooping, etc.) to the stable first suspension in a second mold of a desired shape encompassing the first suspension and the second suspension.

In operation 316, the first suspension and the second suspension are cured in the second mold at a temperature of between about 20° C. and about 80° C. until stable.

Any of the descriptions and embodiments described above are applicable to method 300.

In yet another embodiment, a method comprises creating a graded and/or composite preform, the preform being mechanically stable without support, i.e., the preform will maintain its shape upon removal of the mold. The preform comprises unsintered inorganic particles.

In one approach, creating the preform may include a gel casting process. The gel casting process includes creating a mixture of the inorganic particles, a solvent, and a dispersant, the inorganic particles having a mean diameter of less than about 2000 nm. Note that the particles do not necessarily dissolve in the solvent; rather the solvent and particles typically form a slurry or suspension. The gel casting also includes agitating the mixture, adding the mixture to a mold, and curing the mixture in the mold at a (mean, median, etc.) temperature of less than about 80° C. for forming a preform.

According to some approaches, the method may be performed with the proviso that no gelling agent is used during the gel casting. In other approaches, a gelling agent may be added, generally at less than about 5 vol. %. Any known gelling agent may be used. Illustrative gelling agents include crosslinking polymers.

In more approaches, the creating the preform may include adding a first mixture of the inorganic particles and a solvent to a first mold, adding a second mixture of inorganic particles (which may be same or different than the inorganic particles in the first mixture) and a solvent (which may be the same or different than the solvent in the first mixture) to a second mold where the second mixture abuts the first and second molds, and removing the molds prior to curing the first and second mixtures. In these approaches, the mixtures flow into each other upon removal of the molds. Note that as used herein, the term "mold" may refer to the entire structure that surrounds the mixture being cast, or a portion thereof. An example of the latter includes a ring resting on a flat base, where the ring and base together form the full mold. In some approaches, the ring ("mold") may be removed, leaving the molded structure on the base for further processing.

In some embodiments, the creating the preform may include adding a first mixture of the inorganic particles and a solvent to a first mold, at least partially curing the first mixture, and adding a second mixture of inorganic particles (which in this or any other embodiment may be same or different than the inorganic particles in the first mixture) and a solvent (which in this or any other embodiment may be the same or different than the solvent in the first mixture) to a second mold, where the second mixture abuts the first and second molds after the adding.

According to additional approaches, the creating the preform may include forming a first preform in a mold, removing the mold from the first preform, and forming a second preform around the first preform in a second mold. Note that the first preform may be simply gelled, partially cured, or fully cured prior to placement in the second mold.

According to some approaches, the first preform may be at least partially cured prior to being placed in the second mold. In other approaches, the first preform may be fully cured, or not cured at all (such as by only being gelled).

In more approaches, the first preform may be sintered prior to being placed in the second mold.

In another approach, creating the preform may include adding a mixture of the inorganic particles and a solvent to a mold, allowing the mixture to gel, and injecting a dopant into a target region of the gelled mixture. This approach tends to create a graded structure where the dopant diffuses away from the immediate vicinity of injection.

In more approaches, creating the preform may include adding a mixture comprising the inorganic particles and a solvent to a mold, allowing the mixture to gel, exchanging liquid in the gelled mixture with a solution having a dopant, and adding a second mixture of inorganic particles in contact with the gelled mixture, wherein some of the dopant diffuses into the second mixture. This approach tends to create a graded structure where the dopant diffuses away from the first-formed gel into the second-formed gel.

According to one approach, the preform may preferably be transparent after sintering thereof.

According to another approach, the preform may include a first portion comprising neodymium doped yttrium aluminum garnet (Nd:YAG) and a second portion immediately adjacent the first portion comprising samariam doped yttrium aluminum garnet (Sm:YAG).

Many of the embodiments disclosed herein may be useful for making ceramic laser parts for a tailored aperture ceramic laser (TACL). It may also provide a simple and elegant way to fabricate other transparent laser components and possibly scintillators for use in radiation detectors and transparent armor, such as windows and windshields on armored vehicles.

In addition, gel casting is a promising new method for forming ceramic parts prior to sintering. The ability to gel cast nano-sized ceramic particles made by flame-spray pyrolysis (FSP), or some other approach, without polymers to theoretical density could make this technique much more widely used in the ceramics industry. It is a particularly simple process and may be used to form parts of a wide variety of intricate shapes. The parts may be produced to an exceedingly exceptional quality after sintering the parts.

Other uses of the methods described herein include producing common ceramics, such as alumina and silica, via gel casting. These materials may also benefit from the particular gel casting methods described herein through easier and/or more predictable material composition.

An article of manufacture according to one embodiment includes a sintered ceramic structure having a first and second regions having differing compositions, wherein an interface between the regions exhibits characteristics of intermingling of the different compositions prior to sintering of the structure. Such characteristics are alluded to above, will be evident to one skilled in the art after reading the teachings herein, and include intermixing and/or diffusion of the uncured, partially cured, and/or fully cured (but unsintered) gels at the interface between them.

In one approach, at least one of the regions of the structure is transparent. In another approach, the sintered structure includes a first portion comprising neodymium doped yttrium aluminum garnet (Nd:YAG) and a second portion immediately adjacent the first portion comprising samariam doped yttrium aluminum garnet (Sm:YAG).

In particularly preferred approaches, no gelling additive or by product thereof (e.g., carbon remaining after the sintering process) is present in the sintered structure.

In yet another approach, the sintered structure has a graded composition profile across a cross section thereof from somewhere in the first region to somewhere in the second region. This would be most evident in a structure formed by the injection method or liquid substitution methods noted above.

In a further approach, the structure comprises a material selected from a group consisting of yttrium aluminum garnet (YAG), neodymium doped YAG, doped or undoped rare earth garnets, yttrium oxide, ytterbium doped yttrium oxide, and doped cubic oxides, and mixtures thereof.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forming a composite transparent ceramic preform, the method comprising:
    forming a first suspension of oxide particles in a first solvent, wherein the first suspension includes a first dispersant, with the proviso that the first suspension does not include a gelling agent;
    adding the first suspension to a first mold of a desired shape;
    uniformly curing the first suspension in the first mold until stable;
    forming a second suspension of oxide particles in a second solvent, wherein the second suspension includes a second dispersant, with the proviso that the second suspension does not include a gelling agent;
    adding the second suspension to the stable first suspension in a second mold of a desired shape encompassing the first suspension and the second suspension;
    uniformly curing the second suspension in the second mold until stable.

2. The method of claim 1, wherein the oxide particles have a primary particle diameter of between about 5 nm and about 2000 nm.

3. A method for forming a composite transparent ceramic preform, the method comprising:
    forming a first suspension of oxide particles in a first solvent, wherein the first suspension includes a first dispersant, with the proviso that the first suspension does not include a gelling agent;
    adding the first suspension to a first mold of a desired shape;
    uniformly curing the first suspension in the first mold until stable;
    forming a second suspension of oxide particles in a second solvent, wherein the second suspension includes a second dispersant, with the proviso that the second suspension does not include a gelling agent;
    adding the second suspension to the stable first suspension in a second mold of a desired shape encompassing the first suspension and the second suspension; and
    uniformly curing the second suspension in the second mold until stable.
    wherein the oxide particles have a primary particle diameter of between about 10 nm and about 80 nm.

4. The method of claim 3, wherein the oxide particles are formed via flame-spray pyrolysis (FSP).

5. The method of claim 4, wherein the oxide particles comprise at least one of: yttrium aluminum garnet (YAG), neodymium doped YAG, yttrium scandium aluminum garnet, lutetium aluminum garnet, gadolinium gallium garnet, yttrium oxide, ytterbium doped yttrium oxide, doped scaudia, doped lutetia, and doped zirconia.

6. The method of claim 4, wherein the first and second solvents have a pH of between about 2 and about 5 or between about 9 and about 12.

7. The method of claim 6, wherein a volume percent of solids in a total volume of the first and second suspensions is between about 15 vol. % and about 60 vol. %.

8. The method of claim 6, wherein a volume percent of solids in a total volume of the first and second suspensions is between about 25 vol. % and about 45 vol. %.

9. The method of claim 4, wherein the oxide particles comprise YAG, wherein the first and second solvents have a pH of between about 9 and about 11, wherein a volume percent of solids in a total volume of the first and second suspensions is between about 25 vol. % and about 45 vol. %.

10. The method of claim 1, wherein the curing the first suspension and the second suspension comprises:
heating the first suspension in the first mold and the second suspension in the second mold to a temperature of between about 20° C. and about 80° C.; and
holding the temperature about constant for a time of between about 4 hours and about 72 hours.

11. The method of claim 10, wherein the first mold and the second mold are sealed during the curing, and wherein the first suspension and the second suspension are heated to a temperature of about 50° C.

12. A method for forming a composite transparent ceramic preform, the method comprising:
forming a first suspension of oxide particles in a first solvent, wherein the first suspension includes a first dispersant, with the proviso that the first suspension does not include a gelling agent;
adding the first suspension to a first mold of a desired shape;
uniformly curing the first suspension in the first mold until stable;
forming a second suspension of oxide particles in a second solvent, wherein the second suspension includes a second dispersant, with the proviso that the second suspension does not include a gelling agent;
adding the second suspension to the stable first suspension in a second mold of a desired shape encompassing the first suspension, and the second suspension;
uniformly curing the second suspension in the second mold until stable;
wherein the curing the first suspension and the second suspension comprises:
heating the first suspension in the first mold and the second suspension in the second mold to a temperature of between about 20° C. and about 80° C., and
holding the temperature about constant for a time of between about 4 hours and about 72 hours; and
calcining at least one of the cured first suspension and the cured second suspension at a temperature of between about 500° C. and about 1100° C.

13. The method of claim 10, further comprising calcining the cured second suspension at a temperature of between about 500° C. and about 1100° C.

14. The method of claim 1, wherein the first suspension has an active dopant, wherein the second suspension has an active dopant different from the active dopant of the first suspension or wherein the second suspension has a different concentration of the same active dopant as the active dopant of the first suspension.

15. The method of claim 1, wherein the first and second solvents comprise at least one of: water, ammonia, nitric acid, yttrium nitrate, aluminum nitrate, an alcohol, an aldehyde, an organic solvent, and urea.

16. The method of claim 1, wherein the first and second dispersants comprise at least one of: an ammonium polymethacrylate, a narrow molecular weight range ammonium polyacrylate, a free metal ion salt, sodium silicate, and ammonium acrylate.

17. A method, comprising:
forming a first suspension of oxide particles in a first solvent, wherein the first suspension includes a first dispersant, with the proviso that the first suspension does not include a gelling agent;
agitating the first suspension;
adding the first suspension to a first mold of a desired shape;
uniformly drying the first suspension in the first mold until stable;
forming a second suspension of oxide particles in a second solvent, wherein the second suspension includes a second dispersant, with the proviso that the second suspension does not include a gelling agent;
agitating the second suspension;
adding the second suspension to the stable first suspension in a second mold of a desired shape encompassing the first suspension and the second suspension;
curing the first suspension and the second suspension in the second mold at a temperature of between about 20° C. and about 80° C. until stable.

18. The method of claim 17, further comprising sintering the cured suspensions for forming a composite transparent ceramic.

19. The method of claim 1, wherein the stable first and second suspensions are
a graded and/or composite preform, the preform being mechanically stable without support,
wherein the oxide particles in the preform are unsintered inorganic particles.

20. The method of claim 19, wherein creating the preform includes a gel casting process.

21. The method of claim 19, wherein the creating the preform comprises:
adding a first mixture of the inorganic particles and a solvent to a first mold;
adding a second mixture of inorganic particles and a solvent to a second mold where the second mixture abuts the first and second molds; and
removing the molds prior to curing the first and second mixtures.

22. The method of claim 19, wherein the creating the preform comprises:
adding a first mixture of the inorganic particles and a solvent to a first mold;
at least partially curing the first mixture; and
adding a second mixture of inorganic particles and a solvent to a second mold, where the second mixture abuts the first and second molds after the adding.

23. The method of claim 19, wherein the creating the preform comprises:
forming a first preform in a mold;
removing the mold from the first preform; and
forming a second preform around the first preform in a second mold.

24. The method of claim 19, wherein the creating the preform comprises:
adding a mixture of the inorganic particles and a solvent to a mold;
allowing the mixture to gel; and
injecting a dopant into a target region of the gelled mixture.

25. The method of claim 19, wherein the creating the preform comprises:
adding a mixture comprising the inorganic particles and a solvent to a mold;
allowing the mixture to gel;
exchanging liquid in the gelled mixture with a solution having a dopant; and
adding a second mixture of inorganic particles in contact with the gelled mixture, wherein some of the dopant diffuses into the second mixture.

26. The method of claim 19, wherein the preform is transparent after sintering thereof.

27. The method of claim 19, wherein the preform includes a first portion comprising neodymium doped yttrium aluminum garnet (Nd:YAG) and a second portion immediately adjacent the first portion comprising samariam doped yttrium aluminum garnet (Sm:YAG).

28. The method of claim 1, further comprising calcining the cured first suspension at a temperature of between about 500° C. and about 1100° C.

29. The method of claim 1, further comprising calcining the cured second suspension at a temperature of between about 500° C. and about 1100° C.

30. The method of claim 1, wherein the second suspension is added to the stable first suspension prior to sintering the stable first suspension.

31. The method of claim 1, wherein the second suspension is added to the stable first suspension prior to calcining the stable first suspension.

32. The method of claim 1, wherein the second suspension is added to the stable first suspension prior to drying the stable first suspension.

33. The method of claim 1, wherein the curing the first suspension continues without drying until the preform is removed from the second mold.

34. The method of claim 1, wherein the first mold and the second mold are sealed during the curing.

35. The method of claim 17, wherein the oxide particles have a primary particle diameter of between about 10 nm and about 80 nm.

36. The method of claim 17, further comprising calcining at least one of the cured first suspension and the cured second suspension at a temperature of between about 500° C. and about 1100° C.

37. The method of claim 17, wherein the second mold is sealed during the curing.

* * * * *